US010734838B2

(12) United States Patent
Roytelman et al.

(10) Patent No.: US 10,734,838 B2
(45) Date of Patent: Aug. 4, 2020

(54) PRACTICAL CONSERVATION VOLTAGE REDUCTION FORMULATION AND METHOD UTILIZING MEASUREMENT AND/OR ALARMING INFORMATION FROM INTELLIGENT DATA GATHERING AND COMMUNICATION TECHNOLOGY DEVICES

(71) Applicant: Open Access Technology International, Inc., Minneapolis, MN (US)

(72) Inventors: Ilya Roytelman, Plymouth, MN (US); Jose Medina Palomo, Minneapolis, MN (US); Ali Ipakchi, San Carlos, CA (US); Sasan Mokhtari, Eden Prairie, MN (US); Farrokh Albuyeh, San Carlos, CA (US); Farrokh Rahimi, Redwood City, CA (US)

(73) Assignee: Open Access Technology International, Inc., Minneapolis, MN (US)

(*) Notice: Subject to any disclaimer, the term of this patent is extended or adjusted under 35 U.S.C. 154(b) by 809 days.

(21) Appl. No.: 14/530,132

(22) Filed: Oct. 31, 2014

(65) Prior Publication Data
US 2015/0120222 A1    Apr. 30, 2015

Related U.S. Application Data

(60) Provisional application No. 61/898,121, filed on Oct. 31, 2013.

(51) Int. Cl.
H02J 13/00 (2006.01)
H02J 3/14 (2006.01)

(52) U.S. Cl.
CPC ............ *H02J 13/0006* (2013.01); *H02J 3/14* (2013.01); *Y02B 70/3225* (2013.01); *Y04S 20/222* (2013.01)

(58) Field of Classification Search
CPC ....... H02J 13/0006; H02J 3/14; Y04S 20/222; G01R 21/133
See application file for complete search history.

(56) References Cited

U.S. PATENT DOCUMENTS 6,154,178 A * 11/2000 Aslan ................. G01R 29/0857
340/600
7,023,680 B1 * 4/2006 Johnson ................. H02H 5/105
324/74

(Continued)

OTHER PUBLICATIONS

Evaluation of Conservation Voltage Reduction (CVR) on a National Level, Pacific Northwest National laboratory report prepared for U.S. Department of Energy, 2010.

(Continued)

*Primary Examiner* — Elias Desta
(74) *Attorney, Agent, or Firm* — Vidas Arrett & Steinkraus P.A.

(57) ABSTRACT

A process/method is provided, which facilitates achieving and obtaining realistic, accurate voltage observability of end customer service delivery points within the secondary distribution level using the alarming capability of intelligent data gathering and communication technology devices such as, but not necessarily limited to SCADA systems, distribution system RTU or SCADA, smart meters, smart gateways, and Advanced Metering Infrastructure (AMI) meters, or any device known in the art capable of sending alarm signals when voltage is detected above or below a predetermined threshold (generally herein defined as "Advanced Meters"). Such system and methods can be applied for many uses comprised of monitoring the energy grid, energy (Continued)

demand management and other energy industry applications, while minimizing operating and infrastructure/hardware costs.

26 Claims, 4 Drawing Sheets

(56) References Cited

U.S. PATENT DOCUMENTS 7,282,921 B2 * 10/2007 Sela .................. G01R 19/2513
324/503
8,437,883 B2 5/2013 Powell et al.

OTHER PUBLICATIONS

M.A. Peskin, P.W. Powerl, E.J. Haii "Conservation Voltage Reduction with feedback from Advanced Metering Infrastructure", Transmission and Distribution Conference and Exposition (T&D), 2012 IEEE PES.
N. Markushevich, L. Wenpeng "Achieving greater VVO benefits through AMI implementation", Power and Energy Society General Meeting, 2011IEEE PES.
I. Roytelman, B. Wee, R. Lugtu, T. Kulas and T. Brossart "Pilot Project to Estimate the Centralized Volt/Var Control Effectiveness", IEEE Transactions on Power Systems, 1998, vol. 13, vol. 3.

* cited by examiner

PRACTICAL CONSERVATION VOLTAGE REDUCTION FORMULATION AND METHOD UTILIZING MEASUREMENT AND/OR ALARMING INFORMATION FROM INTELLIGENT DATA GATHERING AND COMMUNICATION TECHNOLOGY DEVICES

CROSS-REFERENCE TO RELATED APPLICATIONS

This application claims priority to U.S. Provisional patent application No. 61/898,121 filed Oct. 31, 2013, the entire content of which is hereby incorporated by reference.

STATEMENT REGARDING FEDERALLY SPONSORED RESEARCH

Not Applicable

FIELD OF THE INVENTION

The present disclosure relates generally to electric power systems and, more particularly, to systems and methods of obtaining voltage observability, determining control actions and then monitoring and adjusting the performance of control actions in real-time.

BACKGROUND OF THE INVENTION

The electrical utility grid or "distribution grid" can be considered to be organized into two general sections: the primary-distribution level and the secondary distribution level. The primary distribution level spans from the point at which electricity enters the distribution grid, through supply substations, step down transformers to feeders that transmit electricity to distribution transformers. The secondary distribution level, spans from these distribution transformers to customer service delivery points. Due to the industry infrastructure operating within the primary-distribution system, such as feeders and step-down transformers, industry personnel can determine the voltage of the distribution grid in the primary distribution level using hardware such as meters. For other primary distribution nodes, voltage can be estimated. Knowledge of this voltage is known as "voltage observability," or simply "observability." This primary-distribution-level observability provides power grid operators with the important ability to ensure proper transmission of electricity throughout the primary distribution grid. Unexpected voltage values may reflect improperly functioning equipment, outages, improper maintenance scheduling, unexpected changes in customer consumption, congestion, or other factors that may be hindering the transmission of electricity. Voltage observability on the primary distribution level is able to be accomplished to within a degree of known error through techniques already known and in practice in the art. This observability is vital to the proper operation of the power grid.

The secondary distribution level is defined as going from distribution transformers to the customer service delivery points. Industry operators are not able to determine the voltage at the distribution transformers from which the electricity flows to service delivery points if those distribution transformers do not have hardware such as meters. Electrical impedance causes voltage drop as electricity travels over both primary and the secondary-distribution levels. Because voltage is affected by these losses, the voltage at service delivery points varies as well, and measured voltage cannot be used to determine the voltage at a more distal point of the power grid.

Even if electrical distance were accurately known at all times, other factors affect the voltage at service delivery points as well. The instantaneous amount of power being consumed by the end user, for example, can have a very large effect on the voltage at that service delivery point. When power usage fluctuates rapidly, so does the voltage associated with that power. Thus, the voltage at any given point on the secondary distribution grid may vary at any given time. This situational uncertainty inevitably introduces error into any voltage estimations that do not have voltage observability at the service delivery point.

Just as there are benefits to voltage observability at the primary distribution level, there are benefits to voltage observability at the secondary distribution level as well. Voltage observability at the secondary-distribution level also aids in regulatory compliance; utility operators are required to deliver electricity to end customers within voltage ranges established by the American National Standard Institute (ANSI). Compliance is measured at the service delivery point, and thus without voltage observability at those points, utilities cannot ensure that the product delivered conforms to regulatory standards.

Several attempts have been made to provide voltage observability at the secondary distribution level. Recently, the industry has transitioned from basic, manual read energy meters at service delivery points to using, throughout much of the electrical grid, more intelligent meters capable of telemetering usage, energization status and voltage levels in real time. These smart meters make up part of what is now known as the Advanced Metering Infrastructure (AMI). One of the goals of the transition to smart meters was to give end users and grid operators constant visibility to the properties of and amount of the power used at the end-user delivery points. Unfortunately, the transition to AMI facilitating smart meters has not provided voltage visibility at the secondary distribution grid for various reasons. While most smart meters can be configured to collect and transmit voltage measurements in real time, this has proved impractical in use. The minority of smart meters that are configured to provide voltage measurements in real time are known in the art as "bellwether meters." Bellwether meters are typically costly to operate in great number due partially to the large amount of bandwidth required to transmit real-time voltage value data. Transmitting such data from a substantial number of bellwether meters would overload modern communications infrastructure. The advanced meter communication infrastructure can typically support only a few bellwether meters per every few hundred smart meters.

While an AMI is comprised of smart meters with voltage alarms, it is impossible to estimate how severe the violations are based on only one voltage alarm setting. As an illustrative example of this, information extracted from setting a single, low voltage alarm of 114 V (the current ANSI range A service low voltage limit) yields the following analysis. A low voltage alarm signal, when accounting for inherent error typical of a majority of smart meters, will identify voltage in approximately the range from 115 V to 113 V or below. Voltage below 114 V is an ANSI range A violation, however, voltage in a range of between 115-114 is still ANSI range A acceptable. At the same time, when the voltage is below 114 Volts, but above 110 Volts (the current ANSI range B service low voltage limit) this is still not necessarily a critical situation, because the ANSI range B limit is not violated. The only conclusion known for certain is that the detected voltage is 115 V or below.

The electrical utility industry has utilized real-time data coming from Supervisory Control and Data Acquisition (SCADA) or Remote Telemetry Unit (RTU) within traditional Conservation Voltage Reduction (CVR) solutions, which provides control actions (of Load Tap Changing [LTC] devices and capacitors, for example) based on observability of the primary distribution system. These primary-distribution-level, RTU or SCADA-based control actions offered little in the way of monitoring voltage constraints at the secondary distribution level, often times leaving utility customers with voltage levels outside of the limits established by the ANSI voltage limits. CVR dependent on RTU or SCADA data alone is often applied on a limited, scheduled basis and is unavailable for more advantageous use, such as when economic considerations would favor utilizing voltage control for electricity demand reduction. Moreover, such CVR does not offer feedback from the secondary distribution level, leaving distribution operators uncertain if residential voltage values satisfy ANSI requirements.

CVR and Dispatchable Voltage Reduction (DVR) are two energy demand-management applications frequently employed within the art to accomplish the reduction of electricity consumption (both power demand and energy). Both CVR and DVR are achieved by changing (typically decreasing) the voltage on a distribution path and can be utilized within Distribution Power Systems as a response to operational requirements such as load peak shaving, to meet economical energy market needs, or for other purposes known within the art. Voltage change can be accomplished within the secondary distribution network through multiple means known in the art, including but not necessarily limited to initiating control actions to modify the parameters of voltage-regulating devices, such as Load Tap Changing (LTC) transformers, Step Voltage Regulators (SVR), and any other similar device known in the art (Voltage Regulating Devices or Voltage Regulator).

Other CVR or DVR solutions, based on AMI service voltage measurements, utilize existing technology known in the art and rely on the assumption that smart meters provide voltage measurements from practically all service points in real-time. As has been discussed, this assumption is incorrect. In practice, only a very small percentage of smart meters can be configured as bellwether meters. Due to changes in the grid topology, it is oftentimes impossible to effectively determine the AMI meters that are at the points of the lowest voltages, and thus grid operators cannot determine whether the voltage values delivered by the few bellwether meters are indicative of the lowest voltages on the grid. These measurements are critical for enacting demand-reduction CVR solutions within industry standardized voltage constraints. Thus, current usage of smart meters on the secondary distribution grid does not provide the necessary voltage observability to enable accurate CVR and DVR solutions.

BRIEF SUMMARY OF THE INVENTION

In general, this disclosure is directed toward systems and methods for achieving and obtaining realistic, accurate voltage observability of customer service delivery points (secondary distribution) using the alarming capability of intelligent data gathering and communication technology devices such as, but not necessarily limited to SCADA systems, distribution system RTU or SCADA, smart meters, smart gateways, and Advanced Metering Infrastructure (AMI) meters, or any device known in the art capable of sending alarm signals when voltage violations occur (generally herein defined as "Advanced Meters"). In one particular embodiment, such Advanced Meters are capable of monitoring and reporting on multiple voltage alarm settings, configured as low or high voltage violations, and can be set to any desired value. In one particular embodiment, the invention can build a numerical grid, the grid points of which are represented by the voltage values that fall above or below those voltage-alarm limits. The invention uses this grid to obtain realistic and accurate voltage observability of customer service delivery points through calculations derived from values obtained by combing various numbers of voltage alarm settings in a sequence. The Advanced Meters in such a grid send alarm signals identifying which alarm settings have been violated, utilizing far less communication infrastructure bandwidth than real-time voltage values would require. The proposed system and method can then extract information from these voltage alarm signals and series of settings.

This realistic voltage observability of customer service delivery points can then be utilized by various energy industry participants or other interested entities for multiple beneficial uses, including, but not necessarily limited to, adjusting or upgrading components of the distribution system, identifying end users with unusually high electricity consumption, and increasing the efficiency of certain electricity demand-control actions dependent on voltage control.

For example, the systems and methods described herein offer economic and reliability benefits for electricity demand-control actions over traditional, RTU or SCADA based CVR by making more cost-effective use of available meter resources while utilizing far less bandwidth from communication infrastructure. Further, the systems and methods described herein provide an accurate reading of DVR status in real-time; functionality that traditional, RTU or SCADA-based CVR is incapable of doing.

Using the systems and methods described in this disclosure, the realistic voltage observability of customer service delivery points can be accurately and cost effectively obtained in near real-time, further facilitating distribution operators' ability to load shave the daily peak load of targeted groups of consumer, commercial, or industrial energy customers.

The systems and methods described herein can utilize Advanced Meters to determine the state and certain operational data of individual assets via use of certain advancements in communication technologies, such as, but not necessarily limited to, ZigBee, XMPP, and other advanced protocols. Such state and operational data can include voltage alarm settings with continuing bellwether meter voltage measurements. Utilizing data acquired from such Advanced Meters, the invention as described can reliably monitor and facilitate the control of voltage at service delivery points, ensuring operation in several ranges, including but not necessarily limited to, ANSI A Range A (126-114 V) with some time periods, and ANSI Range B (127-110 V), while not violating the Range B low limit of 110 Volts.

The proposed system and method comprises both measurements for primary distribution grid observability and also for secondary distribution grid observability. The proposed methodology does not base the CVR formulation on a non-realistic assumption of widely available AMI voltage measurements, but rather, in a particular embodiment, combines bellwether meter voltage measurements from a small number of service delivery points with voltage violation alarm signals coming from a majority of service delivery points with Advanced Meters installed.

In at least one embodiment, this disclosure is directed to a computer program for use with a graphics display device, the computer program comprising a computer usable medium having computer readable program code embodied in the medium for facilitating the systems and methods described herein, more specifically computer program code for the input of various data, user enrollment and registration of assets, calculation and modeling of asset characteristics, aggregation of modeled assets and asset characteristics, and revaluation and/or recalculation of asset models.

The invention may take the form of a system for obtaining the realistic voltage observability of customer service delivery points configured to:

Obtain a grid topological model,

Establish current bellwether meters and Advanced Meter locations related to Voltage Regulators on topological model, Establish voltage alarm configurations for a group of Advanced Meters on the topological model, Monitor for voltage alarms from Advanced Meters, Analyze a series of Advanced Meter voltage alarms for patterns of real-time voltage on the topological model.

The invention may take the form of a system for obtaining the realistic voltage observability of customer service delivery points for optimizing Dispatchable Voltage Reduction configured to:

Obtain a grid topological model,

Establish voltage alarm configurations for a group of Advanced Meters on the topological model, Establish bellwether meters and voltage alarm locations per remotely controlled Voltage Regulators Calculate the maximum allowed voltage decrease per Voltage Regulator Communicate instructions to execute control actions to Voltage Regulators Monitor the voltage response to the executed control actions Determine corrective actions required to address voltage violations Communicate determined corrective action instruction to corresponding Voltage Regulators if needed.

The invention may also include a method to obtain the realistic voltage observability of customer service delivery points by:

Obtaining a grid topological model,

Establishing current bellwether meters and Advanced Meter locations related to Voltage Regulator on topological model, Establishing voltage alarm configurations for a group of Advanced Meters on the topological model, Monitoring for voltage alarms from Advanced Meters, Analyzing a series of Advanced Meter voltage alarms for patterns of real-time voltage on the topological model.

The invention may take the form of a method for obtaining the realistic voltage observability of customer service delivery points for optimizing Dispatchable Voltage Reduction configured to:

Obtaining a grid topological model,

Establishing voltage alarm configurations for a group of Advanced Meters on the topological model, Establishing bellwether meters and voltage alarm locations per remotely controlled Voltage Regulators Calculating the maximum allowed voltage decrease per Voltage Regulator Communicating instructions to execute control actions to Voltage Regulators Monitoring the voltage response to the executed control actions Determining corrective actions required to address voltage violations Communicating determined corrective action instruction to corresponding Voltage Regulators if needed.

The details of one or more aspects of the disclosure are set forth in the accompanying drawings and the description below. Other features, objects, and advantages will be apparent from the description and drawings, and from the claims.

DETAILED DESCRIPTION OF THE INVENTION

Figure 1:
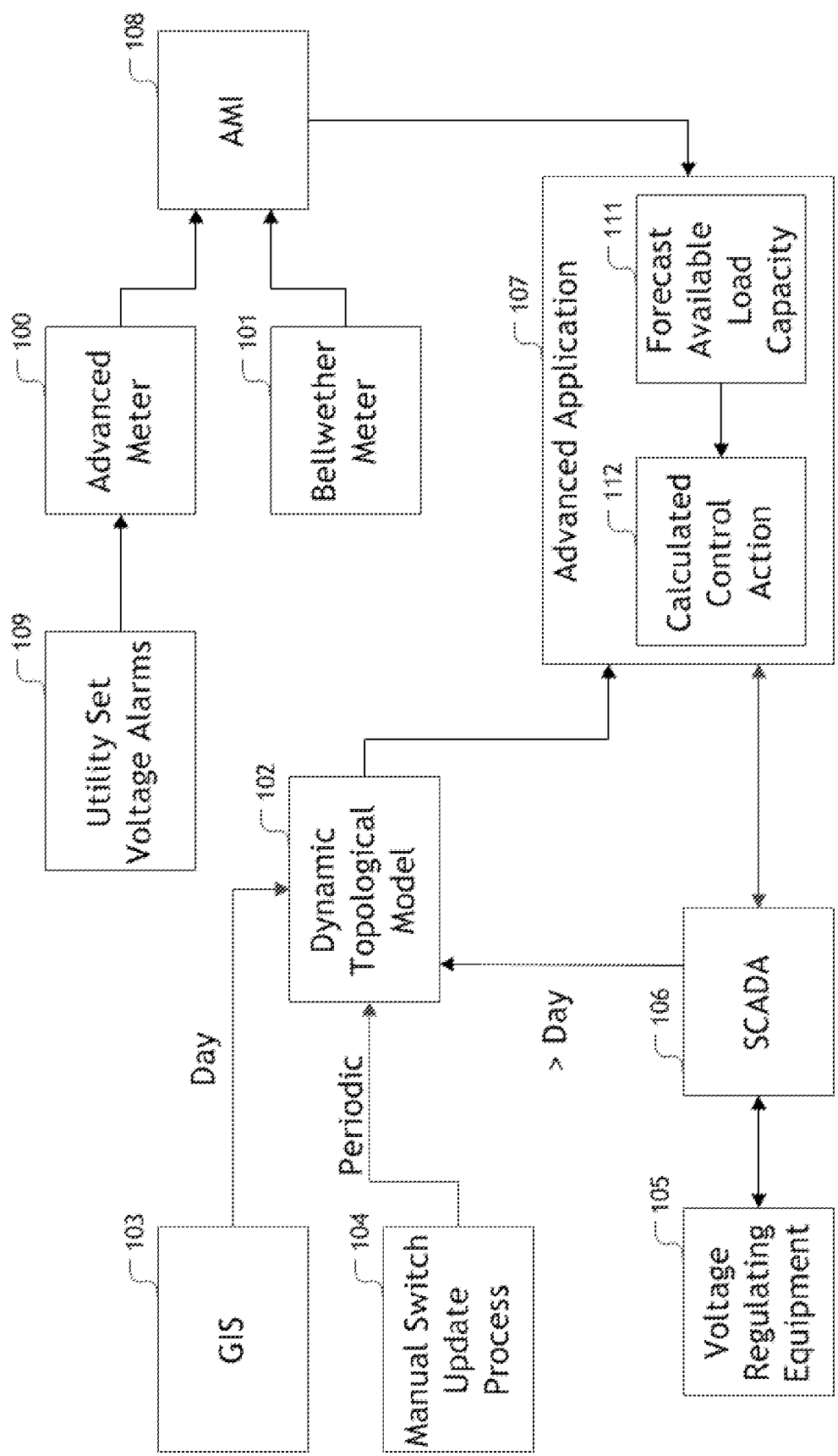
FIG. 1 is a flow chart depicting the general components of the process for obtaining service delivery point voltage observability and subsequent control of enacted demand response events according to one embodiment of the present invention.

While this invention may be embodied in many forms, there are specific embodiments of the invention described in detail herein. This description is an exemplification of the principles of the invention and is not intended to limit the invention to the particular embodiments illustrated.

For the purposes of this disclosure, like reference numerals in the figures shall refer to like features unless otherwise indicated.

In general, this disclosure is directed toward systems and methods for achieving and obtaining realistic, accurate voltage observability of end customer service delivery points (secondary distribution) using the alarming capability of intelligent data gathering and communication technology devices such as, but not necessarily limited to SCADA systems, distribution system RTU or SCADA, smart meters, smart gateways, and Advanced Metering Infrastructure (AMI) meters, or any device known in the art capable of sending alarm signals when voltage is detected above or below a predetermined threshold (generally herein defined as "Advanced Meters") for use in monitoring the energy grid, energy demand management and other energy industry applications, while minimizing operating and infrastructure/hardware costs. Using the techniques of this disclosure, distribution operators, energy utilities, energy utility customers and other energy industry members may become active participants and/or decision makers in the information process.

Distribution power system operators are required to deliver electricity to end customers with quality requirements and standards such as voltage ranges specified by ANSI. The power distribution system must remain within these voltage constraints as measured at the service delivery point within the secondary distribution level, as discussed above. The present disclosure relates to systems and methods that facilitate the monitoring of estimated voltage conditions at service delivery points to inform power distribution system operators of potential malfunction or misalignment of grid equipment, out-of-the ordinary usage patterns, and voltage violations before or during control action events through utilization of Advanced Meter voltage alarms bolstered by bellwether meter data as available or desired. Whether the participant's interest is financial, environmental, or the reliable operation of the bulk electric system, the described system and methods for achieving and obtaining realistic, accurate voltage observability of customer service delivery points (secondary distribution) provides a previously unutilized method to detect potential issues in the transmission system.

Referring to FIG. 1, which is a diagram illustrating an embodiment of one application of the processes in the present invention, the Advanced Meters 100 installed at service delivery points are capable of issuing multiple, distinct alarms if the detected voltage level at the Advanced Meter 100 moves outside of a predefined operating range for longer than a predefined period (typically 60 to 120 Seconds). Such Advanced Meter voltage alarms have relatively minor bandwidth requirements to be effectively communicated across communication infrastructure. A bellwether meter 101 is typically capable of providing an accurate reading of voltage at the meter's location (typically a customer service delivery point) in real time. Bellwether meters 101, though communicating voltage reading in real-time, are few in number. The relatively low number of bellwether meters 101 present within a voltage regulating zone further lowers the bandwidth demands on a communication infrastructure in order to successfully communicate voltage data in real time.

Advanced Meters 100 send voltage alarms as signals, not as voltage value, as soon as a violation occurs. The AMI alarm setting is typically an integer value with low accuracy (often +/−1 Volt in per units based on 120 Volts scale).

It is important to note that most Advanced Meters are inherently capable of detecting not only a single high or low threshold for each alarm, but are capable of detecting anything outside a pre-determined voltage range. These voltage-range alarms contain both low alarm thresholds, for which an alarm is triggered if the voltage drops below said configured low alarm threshold, and high alarm thresholds, for which an alarm is triggered if the voltage rises above said configured high alarm threshold. For example, if an Advanced Meter had two voltage alarms set, the first voltage alarm may have a low-voltage threshold at 109 V, and a high-voltage threshold at 127 V. The second alarm may have a low-voltage threshold at 112 V, and a high-voltage threshold at 124 V. In this situation, the first alarm would be triggered if the voltage were below 109 V or above 127 V. The second alarm would be triggered if the voltage were between 109 V and 112 V or between 124 V and 127 V. In this way, the voltage alarm parameter preferences can be used to create intricate triggering configurations that can be used, in conjunction with identical voltage alarm parameters configured on a group of other meters, to determine voltage throughout the grid.

Figure 2:
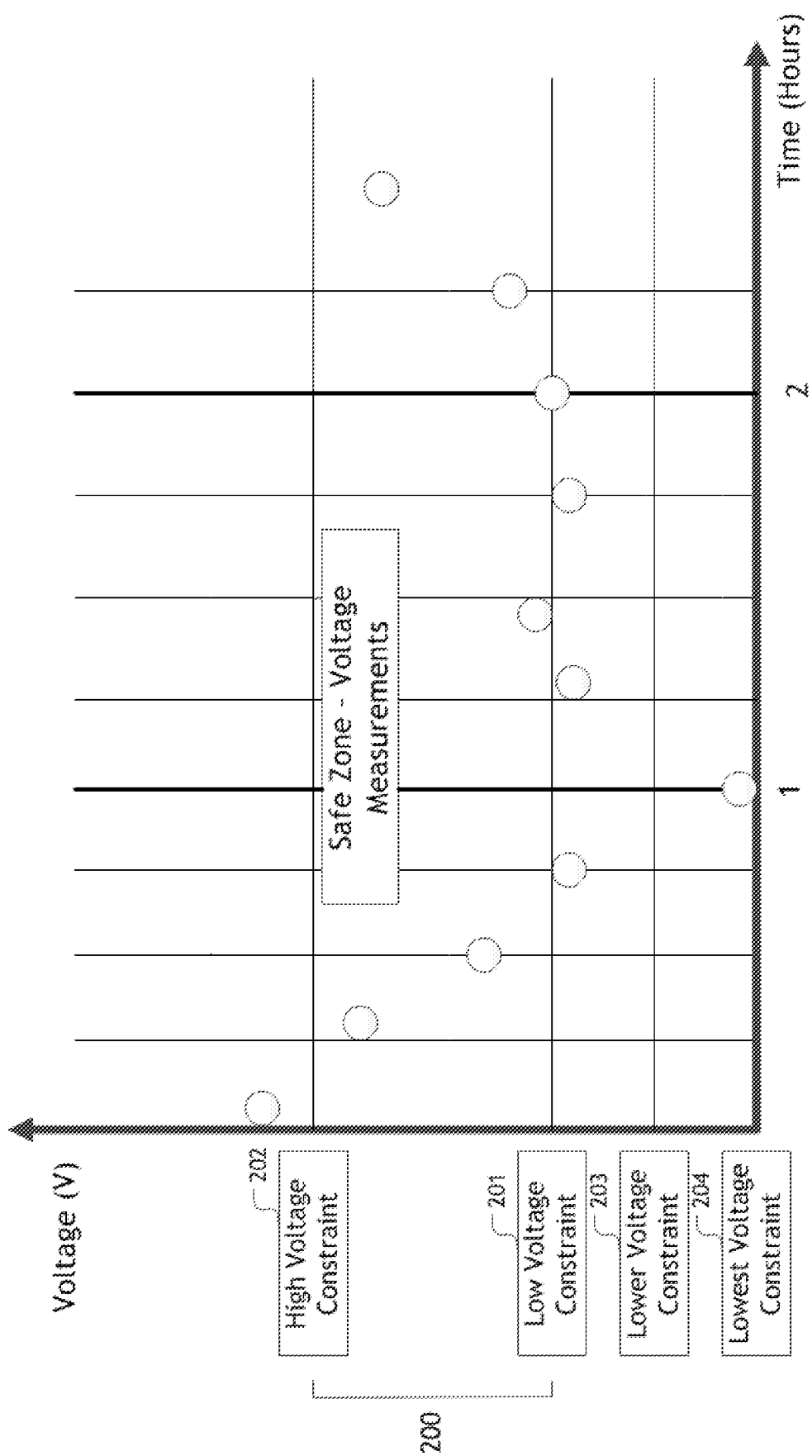
FIG. 2 is a plotted graph illustrating an embodiment of bellwether meter recorded voltage values as well as Advanced Meter voltage alarms for one voltage zone as a factor of time.

Referring now to FIG. 2, many Advance Meters, are capable of storing settings for multiple voltage alarms, configured with low and high voltage limits (Alarm Pairs), and set to any desired value. For example, if the low voltage constraint limit 201 of Alarm Pair 200 were set to X volts while the high voltage constraint limit 202 of Alarm Pair 200 were set to A volts, an Advanced Meter could be configured with "voltage alarm parameters 1" to send distinct alarm messages upon the detection of a low voltage reading of X volts or below. Similar low voltage alarms could be configured as a lower voltage constraint limit 203 set to X-Y volts for "voltage alarm parameters 2," and a lowest voltage constraint limit 204 set to X-Y-Z volts for "voltage alarm parameters 3," where the variables A, X, Y, and Z are all typically but not necessarily integer values of volts. Voltage alarm parameters 2 and 3 would have high voltage constraint limits as well, though omitted here for ease of understanding.

Each alarm is uniquely associated with its corresponding set of voltage alarm parameters such that upon detecting a voltage reading below the lower voltage constraint limit 203 of X-Y volts, such exemplary Advanced Meter would communicate a low level voltage alarm corresponding to "voltage parameters 2" has been detected. Moreover, Advanced Meters will only send the alarm of the most severe voltage violation. Therefore, upon detecting a more severe voltage at or below the lowest voltage constraint limit 204 of X-Y-Z volts, such hypothetical Advanced Meter would communicate only that the low level voltage alarm has been detected for voltage alarm parameters 3. Any possible number of voltage alarm parameters can be set dependent on the make and functionality of the Advance Meter selected to operate within the disclosed system and methods.

Upon seeing a voltage alarm parameter 3 signal, distribution operators would understand that the meter detected voltage at the service delivery points was less than the ranges of voltage alarm parameter 1 and voltage alarm parameter 2. In one embodiment of the invention, specific action instruction can be developed to correspond with various voltage alarm signals received. In one example, a distribution operator may be instructed to monitor voltages upon receipt of a voltage alarm signal corresponding to voltage parameter 1, whereas a distribution operator may be instructed to take immediate corrective action to raise voltage in response to the receipt of a voltage alarm signal corresponding to voltage parameter 3. Actions can be tailored as deemed necessary by process participants.

The systems and methods described herein can further be used to combine voltage alarms into a numerical grid to determine precise estimations of voltage values throughout the grid. By combining alarm sources and settings in a sequence, far more information is available to users of the systems and methods, such as the accurate estimation of the voltage values which violate ANSI limits.

These intricate patterns can be especially useful when the Advanced Meters installed on the power grid are only capable of sending, or only programmed to send, one alarm per meter. If all meters in this example had the same alarm value set, very little information would be available from that alarm setting. For example, if all meters had a pre-determined range of 110 V to 126 V, the absence of an alarm would only provide information that the voltage is between 110 V and 126 V, but would not disclose whether the voltage were 111 V, 125 V, or between the two. This is concerning, as 111 V is very close to a low-voltage violation of ANSI range B, and 125 V is very close to a high-voltage violation of ANSI range A, but industry personnel using this alarm would not have any indication that the voltage is closer to one or the other. Similarly, if all meters had a pre-determined range of 115 V to 117 V, a low-voltage alarm would not inform industry personnel whether the voltage is at 114 V, an acceptable value, or 109 V, an ANSI Range B violating value.

Applying the systems and methods of the present disclosure overcomes the limitations of the previous example by utilizing Advanced Meters capable of multiple alarms per meter nested within one another, or by varying the alarm settings in a large population of Advanced Meters. In one particular embodiment, all Advanced Meters are able to accept multiple voltage alarm parameters, each meter is programmed with alarm ranges of increasing size that are nested within one another. Further, each Advanced Meter is programmed to only communicate the most severe voltage alarm that is violated. Thus, in an Advanced Meter with 5 voltage alarms pairs, Alarm 1 may have a range of 115-119 V, Alarm 2 of 113-121 V, Alarm 3 of 111-123 V, Alarm 4 of 109-125 V, and Alarm 5 of 107-127 V. When the voltage is measured as 113 V, Alarm 2 would communicate a low-voltage alarm, informing industry personnel that the voltage is between 113 V (the low-voltage limit of Alarm 2) and 115 V (the low-voltage limit of Alarm 1). When the voltage is measured as 120 V, Alarm 1 would communicate a high-voltage alarm, informing industry personnel that the voltage is between 119 V and 121 V. By programming Advanced Meter voltage alarms in this way, industry personnel are thus able to get very detailed voltage value information from the entire grid, rather than a small percentage of the grid using bellwether meters alone.

Figure 3:
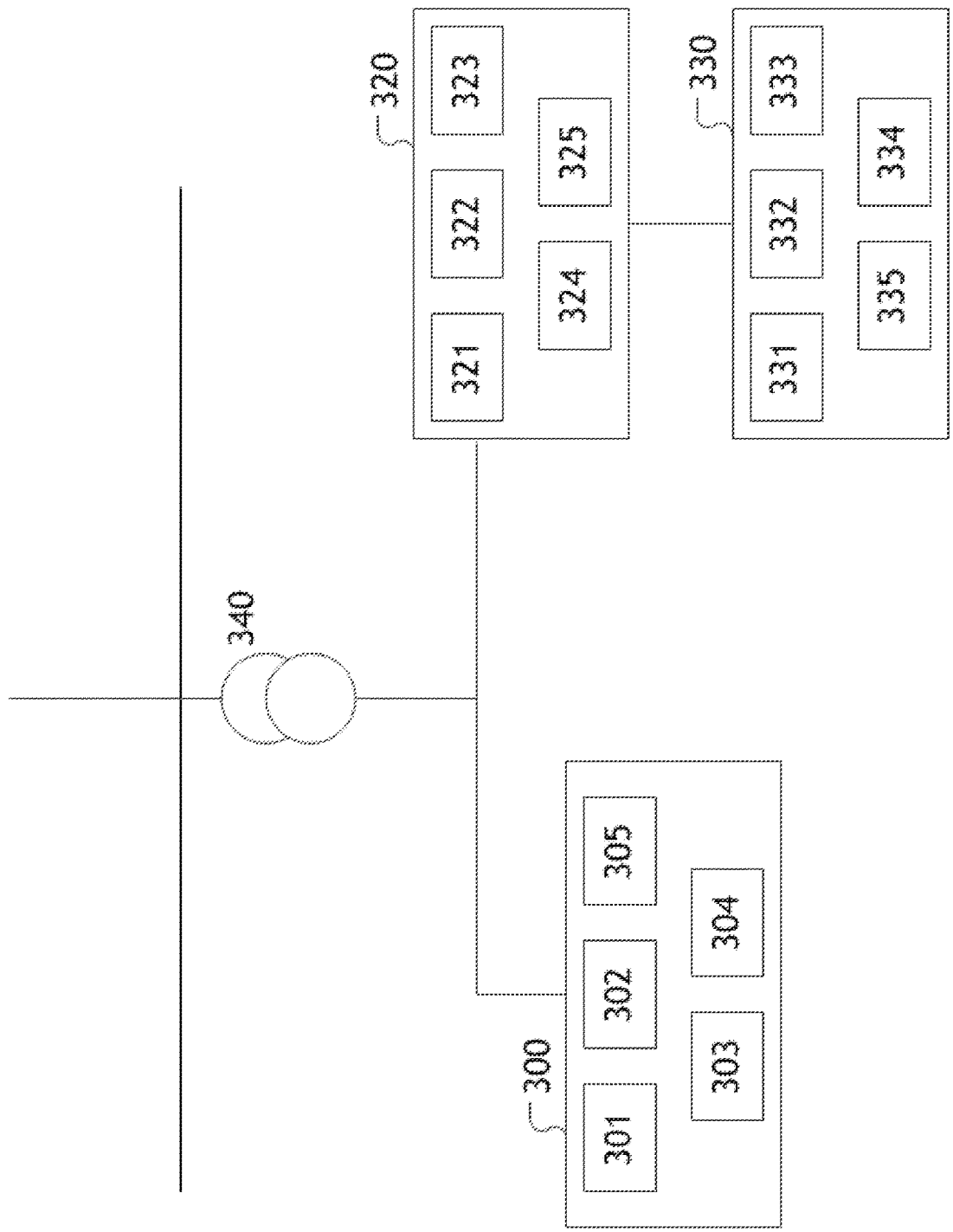
FIG. 3 is a diagram illustrating an example of a system of secondary distribution level Advanced Meter organization within a power distribution system according to one embodiment of the present invention.

In a further embodiment, the systems and methods are applied to obtain voltage observability where the power grid is populated with Advanced Meters that are configured with fewer voltage alarms than are necessary to maintain voltage observability of a large voltage range with the desired accuracy. If an Advanced Meter were only configured with Alarms 1-3 from the previous example, that Advanced Meter would provide accurate voltage observability of the voltages corresponding to Alarms 1-3, but would not provide observability of the desired voltage range because the voltages corresponding to Alarms 4 and 5 would not be monitored. Similarly, if an Advanced Meter were only configured with Alarms 1, 4, and 5, that Advanced Meter would provide voltage observability of the entire desired voltage range, but would not provide accuracy, as there would be a gap in the voltages monitored between Alarms 1 and 4. In this case, the systems and methods of the present disclosure vary the voltage alarms assigned to each Advanced Meter on the grid such that the ranges from Alarms 1-5, or similar ranges, are present in multiple positions of the power grid. Such an embodiment is illustrated in FIG. 3. In this embodiment, Advanced Meters 301-305, 321-325, and 331-335 may be grouped according to similar electrical distance from the nearest Transformer 340. In each Group 300, 320, and 330, the disparity of the electrical distances between each Advanced Meters 301-305, 321-325, and 331-335 and Transformer 340 would be as small as possible while still providing a large enough group to provide a variety of alarms. Voltage alarm ranges similar to those from Alarms 1-5 would be distributed throughout each Group 300, 320, and 330 such that every range would be spread throughout the group. For example, if each Advanced Meter 301-305 may be configured with fewer voltage alarms necessary to provide voltage observability of a desired voltage range and with a desired accuracy. If each Advanced Meter were configured with only 2 of Alarms 1-5, for example, Advanced Meter 301 may be configured with Alarms 1 and 2, Advanced Meter 302 may be configured with Alarms 2 and 3, and so on. Similarly, if each Advanced Meter 321-325 were only configured with 1 of Alarms 1-5, Advanced Meter 321 may be configured with Alarm 1, Advanced Meter 322 may be configured with Alarm 2, and so on. In preferred embodiments, Advanced Meters farthest from Transformer 340 in electrical distance would be assigned voltage alarms with lower voltage thresholds, to account for voltage loss over that electrical distance. While in practice there are limits to the number of Advanced Meters that are assigned to a single distribution transformer, these methods can be applied to large populations of Advanced Meters regardless of whether those Advanced Meters are controlled by multiple distribution transformers, or a single distribution transformer.

In a further embodiment, Groups 300, 320 and 330 may be composed not simply of Advanced Meters, but subgroups of Advanced Meters. In this example, at least some of 301-305, 321-325, and 331-335 would be subgroups composed of several Advanced Meters. Within each such subgroup, voltage alarm values would be varied throughout the subgroup to provide accurate voltage observability throughout the entire desired range of alarm values throughout the entire subgroup. Groups 300, 320 and 330 may be divided into subgroups due to the same or different criteria. Because voltage will tend to be similar in Advanced Meters of similar electrical distance from the transformer, the average voltage alarm activity throughout each group can be attributed to the group as a whole, and the average voltage of the group can be estimated with unprecedented accuracy.

In a further embodiment related to the immediately preceding examples, Groups 300, 320, and 330, the related subgroups, or any combination thereof, may not be organized based solely on electrical distance, but geographical distance, or other factors as well. This may be useful to make monitoring Advanced Meters in large groups of meters that are expected to be very similar in electrical distance, such as in urban and suburban environments, more manageable. For example, Groups 300, 320, and 330 may represent residential suburban settlements, with subgroups organized based on proximity to a major road. Alternatively, Groups 300, 320, and 330 may all be similar in electrical and geographical distance, but may be organized base on usage patterns. For example, in a large city, Group 300 may represent the city's residential end users such as in apartment buildings, Group 320 may represent the city's commercial end users, and Group 330 may represent the cities industrial end users. Within each Group, subgroups may be organized based on historical use patterns, with the highest-energy-consuming users organized together, and the lowest-energy-consuming users organized together, for example. All these criteria could be applied to different levels of organization when grouping Advanced Meters in different situations to facilitate voltage observability of the power grid.

In the above embodiments of the invention, industry personnel may utilize the precise observability granted by the voltage alarm grid (either composed of Advanced Meters with multiple alarms or with single alarms) to detect when distribution transformers or conductors requires adjustment or upgrade. If, for example, the observability provided by the alarm grid provided information that the voltage for all or almost all Advanced Meters below a transformer were far lower than expected, it is very likely that the transformer feeding those Advanced Meters would require adjustment, replacement with a similar transformer, or that a larger transformer would be necessary to feed the load demanded by all the Advanced Meters. Without the observability of the above embodiments, this activity may go undetected.

In one embodiment of the disclosed invention, real-time measurements coming from primary distribution (SCADA, RTUs) are combined with secondary distribution (bellwether AMI meters) with real-time voltage alarms (digital signals) coming from the Advanced Meters installed at service delivery points.

In one embodiment of the disclosed invention, dynamic topological models are utilized to establish real-time connection between Voltage Regulating Devices, comprised of Load Tap Changing (LTC) transformer, Step Voltage Regulator (SVR), and any other similar device known in the art, and customer Advanced Meters. Such topological models can be built upon data extracted from a geographic information system (GIS) and updated with voltage regulating device data and Advanced Meters data from RTU or SCADA systems.

In some embodiments of the invention, software and data communications infrastructure may be utilized to maintain current information regarding the settings of the local controllers, monitoring LTC transformers and SVRs, monitor voltage measurements at the LTC SVR regulated bus, monitor bellwether meters measurements and monitor AMI Advanced Meter voltage alarms.

In one embodiment of the disclosed invention, an estimate of the available load reduction capabilities per each voltage-regulating device or Advanced Meter is provided. This functionality allows distribution operators to select the required load-reduction modifications, provided that such load reduction should be below maximum available, i.e., the resulting voltage is above minimum voltage constraints. The desired load reduction can be modified during Voltage Reduction event duration.

In one embodiment of the disclosed invention, DVR engines run periodically during Voltage Reduction event duration to potentially provide required load reduction alterations during each Voltage Reduction event duration period, which can be used to assist in preventing voltage violations.

Referring back to FIG. 1, beginning with the accurate formation of a topological grid model 102 as imported on a regularly recurring basis from a geographic information system (GIS) 103. Such topological grid model 102 may also be updated through manual switch updating for feeder reconfiguration or meter transferring processes 104, such as processes for manually updating Advanced Meter data as part of irregularly recurring electric utility company meter maintenance or the like.

In one embodiment, the systems and methods of the current invention may then accurately maintaining said topological model 102 to represent the current connectivity of Advanced Meters 100 and Bellwether Meters 101 and Voltage Regulating Equipment 105 along a distribution feeder. RTU or SCADA systems 106 may be utilized to provide real-time updates to the topological model 102.

The topological model 102 is then imported into an advanced application 107 capable of various functionalities typically associated with demand response management systems or economic optimization systems known in the art including, but necessarily not limited to, performing optimization calculations, scheduling voltage reduction events, and control action calculation and communication to SCADA/RTU 106 for execution. Voltage alarm data from Advanced Meters 100 and voltage value measurements from bellwether meters 101 are passed into the advanced application 107 via AMI 108. In some embodiments, the voltage-alarm constraints of the Advanced Meters 100 may also be coordinated and communicated to the Advanced Meters 100 to facilitate the grouping and further subgrouping of Advanced Meters 100 as necessary. A utility or other process participant will set 109 the voltage Alarms of the Advanced Meters 100 as required for the particular voltage observability objective.

The disclosed system and methods may then utilize a mathematical model to forecast the available load decrease capability 111 of each Voltage Regulating Device over a future horizon based on the current local controller settings as obtained through RTU or SCADA systems 106, estimated voltage levels at the customer service delivery points based on bellwether meter 101 voltage measurements and any received Advanced Meter 100 voltage alarms, and the statistical baseline load profiles at the Voltage Regulating Device 105 locations. Typical future horizons utilized within the energy industry comprise a horizon covering the next 24 hours or the next seven days, however, any time horizon is conceivably acceptable for use within the disclosed system and method, so long as the forecast 111 calculated from the mathematical model is accurate.

Using the calculated forecast 111, the available load decrease capability for each Voltage Regulating Device 105 is updated through communicated control action 112. In some embodiments of the invention, an aggregated total load decrease of the whole distribution system level may be calculated on regular intervals, maintaining an up to date forward and rolling forecast for the chosen future horizon.

In some embodiments of the invention, the advanced application 107 may create a DVR schedule within the time range of the calculated forecast 111. An operator can specify the parameters of such DVR schedule by each regulator or, using methods and systems known in the art, or simply let the functionality of the advanced application 107 system to determine which regulators to move in order to achieve the targeted load decrease level.

If a target load decrease level at the system level has been specified, the inventive system and methods may then utilize a mathematical model, implemented as an advanced application 107, to determine which set of Voltage Regulating Devices 105 should be utilized to achieve the specified load decrease target, and what the contribution and DVR schedule should be for each component of Voltage Regulating Devices 105 identified as participating in the DVR.

The disclosed system and methods then further utilize an advanced application 107 to calculate, using any method known in the art, the control action required 112 for each of the participating Voltage Regulating Devices 105 according to the load decrease target determined. For example, for Voltage Regulating Devices 105 regulated by the local controllers, the control action 112 may comprise modifying the desired setting parameters of the local controller.

The disclosed system and methods utilize the data communications capability of advanced applications 107 to communicate each control action 112 to the corresponding Voltage Regulating Device 105 via an RTU or SCADA system 106 required to facilitate the scheduled control action event. Various communication protocols are available to and known in the art to make such communication and control Voltage Regulation Devices, such as, but not limited to, MultiSpeak formatted XML messaging.

Upon the initiation of a scheduled control action event, Voltage Regulating Devices 105 modify voltage at service delivery points. Advanced Meters 100 installed at an affected service delivery point and detecting voltage in violation of voltage-alarm constraints communicate corresponding voltage-alarm signals to an AMI system 108. Likewise bellwether meters 101 installed at an affected service delivery point communicate voltage values to an AMI system 108 during the control action event's duration.

Figure 4:
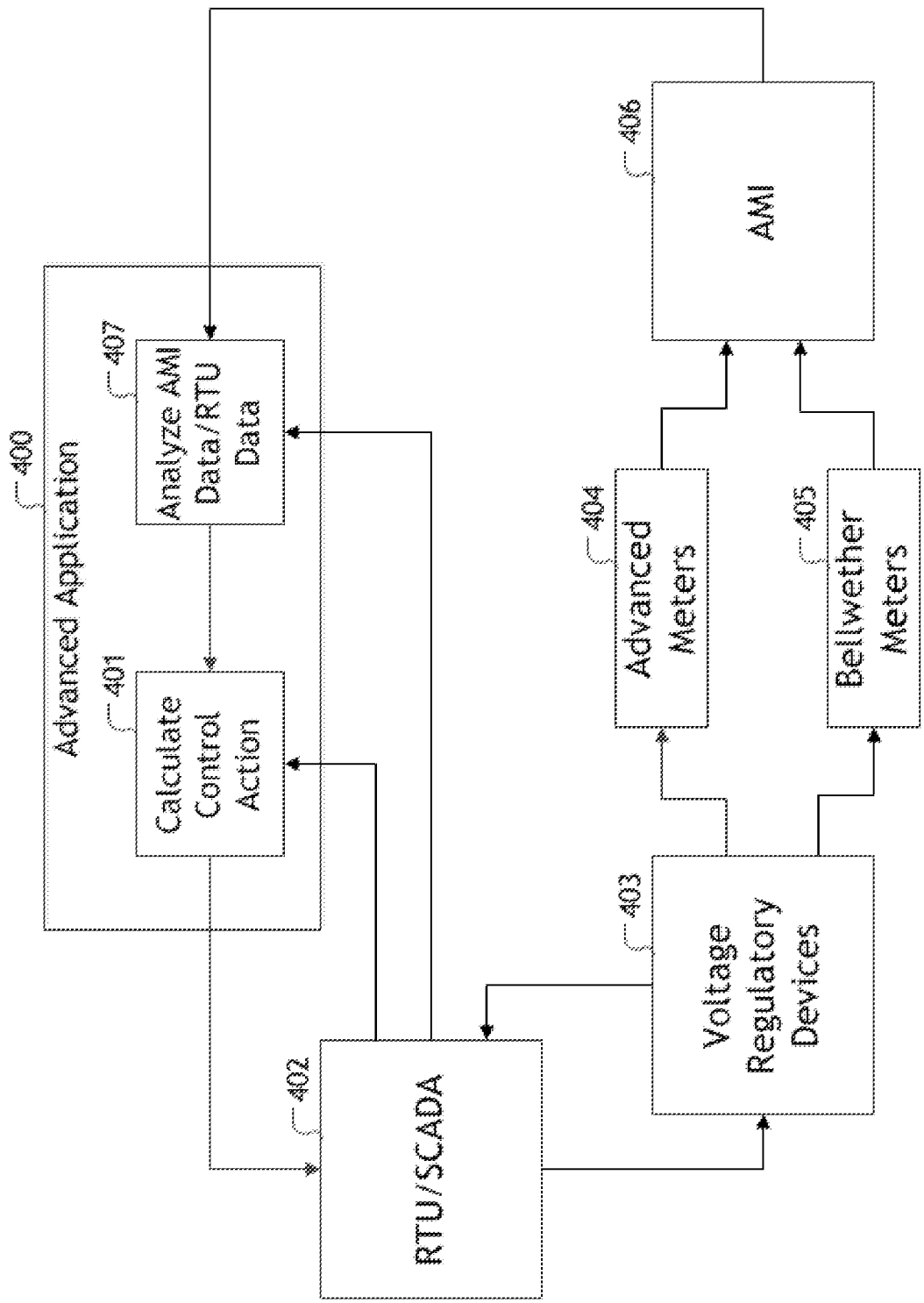
FIG. 4 is a flow chart depicting the general components of the process for monitoring service delivery point voltage according to one embodiment of the present invention.

Referring to FIG. 4, during a control action event, Advanced Meter 404 voltage alarms and bellwether meter 405 voltage values may be passed along by the AMI system 406 to the advanced application 400. Likewise, Voltage Regulating Device data 403 may be passed along by the SCADA/RTU 402 to the advanced application 400. The advanced application 400 may then analyze the AMI and SCADA/RTU data 407 to determine whether adjustments to the Voltage Regulating Devices 403 are necessary for achieving either the targeted load decrease or to maintain voltage level at the service delivery point without violating ANSI or other voltage constraints limits during the duration of the control action currently being executed. Should the analysis suggest a modification, the advanced application 400 may recalculate control actions 401 to be delivered to the Voltage Regulating Devices 403 via SCADA/RTU 402 thereby optimizing voltage control to achieve either the targeted load decrease or to maintain voltage level at the service delivery point without violating ANSI or other voltage constraints limits. Advanced Meter 404 voltage alarms of varying severities may each signify a different action based upon the severity of the voltage violation detected.

During periodic DVR execution, if voltage alarms occur, the advanced application 400 may respond with corrective actions 401 to modify voltage and eliminate voltage alarms. If adjustments to the Voltage Regulating Devices 403 are deemed necessary, the advanced application 400 may repeat the calculation of forecast required for control action adjustment calculation 401 necessary to eliminate the violations. Such process for corrective control actions may be based upon a time frame with length dependent upon the severity of the alarm signal received. The repeated calculations are then used to repeat a calculation of control actions 401 which are then further communicated to the Voltage Regulating Devices 403 during the duration of the control action event, thereby adjusting the voltage allowing the control action to continue to the maximum extent possible without violating voltage constraints.

The invention claimed is:

1. A method for estimating the voltage values throughout the secondary distribution grid, said method comprising the following steps:
   identifying the service delivery points of a plurality of Advanced Meters throughout the secondary distribution grid;
   establishing a set of alarm settings on said plurality Advanced Meters such that each said Advanced Meter will transmit a voltage alarm when a voltage is detected beyond the voltage threshold corresponding to said voltage alarm;
   monitoring voltage alarms transmitted by said plurality of Advanced Meters;
   comparing voltage-alarm data from service delivery points from which voltage alarms were sent;
   extrapolating estimated voltage values from said compared voltage alarm data;
   combining said estimated voltage values with SCADA/RTU voltages and tap positions to calculate Voltage Controller settings or LTC tap positions providing maximum possible voltage decrease for Conservation Voltage Reduction;
   monitoring real-time estimated voltage values during a Conservation Voltage Reduction event;
   analyzing said monitored real-time estimated voltage values to determine whether further voltage adjustments are necessary to achieve deeper voltage reduction or eliminate possible voltage violations;
   analyzing said estimated voltage values during a voltage-modification event to determine whether further voltage adjustments are necessary to achieve the targeted load increase or decrease, and
   analyzing said estimated voltage values during a voltage-modification event to determine whether further voltage adjustments are necessary to avoid violating voltage constraint limits.

2. The method of claim 1, wherein the service delivery points of some of the plurality of Advanced Meters are known and attributed to said monitored voltage alarms.

3. The method of claim 1, wherein some Advance Meters are configured with more than one high-voltage threshold, low-voltage threshold, or high-and-low-voltage range threshold.

4. The method of claim 1, wherein some Advanced Meters are configured with only one high-voltage threshold, low-voltage threshold, or high-and-low-voltage range threshold.

5. The method of claim 1, wherein some Advanced Meters are organized into groups or subgroups, wherein the voltage alarms and corresponding voltage thresholds vary among the Advanced Meters in the group or subgroup.

6. The method of claim 5, wherein some Advanced Meters are assigned to said groups or subgroups based on electrical distance from the nearest distribution transformer.

7. The method of claim 5, wherein some Advanced Meters are assigned to said groups or subgroups based on geographic distance from the nearest distribution transformer.

8. The method of claim 5, wherein some Advanced Maters are assigned to said groups or subgroups based on whether the electricity consumed at the Service Delivery Point associated with that Advanced Meter is by an industrial, residential, or commercial entity.

9. The method of claim 5, wherein some Advanced Meters are assigned to said groups or subgroups based on historical electricity-consumption patterns at the Service Delivery Point associated with that Advanced Meter.

10. The method of claim 1 wherein some Advanced Meters are configured to transmit real-time voltage measurements instead of or in addition to voltage alarms.

11. The method of claim 1, wherein said estimated voltage values are monitored to detect the need for adjustment, replacement, or upgrade of distribution transformers or conductors.

12. The method of claim 1, wherein said estimated voltage values are monitored to detect power outages.

13. The method of claim 1, wherein said estimated voltage values at the customer service delivery points are utilized to forecast the available load decrease capability of a voltage-reduction event.

14. The method of claim 12, wherein adjustments are made to said Voltage Controller settings during a voltage-modification event in response to the analysis of said estimated voltage values.

15. A system used to estimate the voltage values throughout the secondary distribution grid, said system comprising:
   a plurality of Advanced Meters;
   a set of alarm settings on said plurality Advanced Meters such that each said Advanced Meter will transmit a voltage alarm when a voltage is detected beyond the voltage threshold corresponding to said voltage alarm;
   means to monitor voltage alarms transmitted by said plurality of Advanced Meters;

means to compare voltage-alarm data from service delivery points from which voltage alarms were sent;

means to extrapolate estimated voltage values from said compared voltage alarm data and;

an Advanced Application configured to:
- utilize said estimated voltage values to forecast the available load decrease capability of a voltage-reduction event;
- utilize said estimated voltage values to determine whether further voltage adjustments are necessary during a voltage-modification event to achieve the targeted load increase or decrease
- utilize said estimated voltage values to determine whether further voltage adjustments are necessary during a voltage-modification event to avoid violating voltage constraint limits, and
- adjust said voltage-modification event in response to the analysis of said estimated voltage values.

16. The system of claim 15, wherein the service delivery points of some of the plurality of Advanced Meters are known and attributed to said monitored voltage alarms.

17. The system of claim 15, wherein some Advanced Meters are configured with only one high-voltage threshold, low-voltage threshold, or high-and-low-voltage range threshold.

18. The system of claim 15, wherein some Advanced Meters are configured to transmit real-time voltage measurements instead of or in addition to voltage alarms.

19. The system of claim 15, wherein some Advanced Meters are organized into groups or subgroups, wherein the voltage alarms and corresponding voltage thresholds vary among Advanced Meters in the group or subgroup.

20. The system of claim 19, wherein some Advanced Meters are assigned to said groups or subgroups based on electrical distance from the nearest distribution transformer.

21. The system of claim 19, wherein some Advanced Meters are assigned to said groups or subgroups based on geographic distance from the nearest distribution transformer.

22. The system of claim 19, wherein some Advanced Meters are assigned to said groups or subgroups based on whether the electricity consumed at the Service Delivery Point associated with that Advanced Meter is by an industrial, residential, or commercial entity.

23. The system of claim 19, wherein some Advanced Meters are assigned to said groups or subgroups based on historical electricity-consumption patterns at the Service Delivery Point associated with that Advanced Meter.

24. The system of claim 15, wherein some Advanced Meters are configured to transmit real-time voltage measurements instead of or in addition to voltage alarms.

25. The system of claim 15, wherein the system utilizes said estimated voltage values to detect the need for adjustment, replacement, or upgrade of distribution transformers or conductors.

26. The system of claim 15, wherein the system utilizes said estimated voltage values to detect power outages.

* * * * *